(12) United States Patent
Kashimura et al.

(10) Patent No.: US 12,293,656 B2
(45) Date of Patent: May 6, 2025

(54) INFORMATION PROCESSING DEVICE FOR SELECTING NOTIFICATION TO PROMPT SAFETY ACTION PERFORMED BY USER IN ACCORDANCE WITH USER BEHAVIOR

(71) Applicant: TOYOTA JIDOSHA KABUSHIKI KAISHA, Toyota (JP)

(72) Inventors: Takashi Kashimura, Nagoya (JP); Takahiro Kato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 179 days.

(21) Appl. No.: 18/159,165

(22) Filed: Jan. 25, 2023

(65) Prior Publication Data

US 2023/0298457 A1 Sep. 21, 2023

(30) Foreign Application Priority Data

Mar. 17, 2022 (JP) ................................ 2022-043227

(51) Int. Cl.
*G08G 1/005* (2006.01)
(52) U.S. Cl.
CPC .................................. *G08G 1/005* (2013.01)
(58) Field of Classification Search
CPC ..................................................... G08G 1/005
See application file for complete search history.

(56) References Cited

U.S. PATENT DOCUMENTS

| | | | | |
|---|---|---|---|---|
| 8,823,530 B2* | 9/2014 | Green | ................ | B60K 28/06 340/576 |
| 9,129,460 B2* | 9/2015 | McClellan | ............. | G07C 5/085 |
| 9,235,987 B2* | 1/2016 | Green | ..................... | G08G 1/00 |
| 9,884,622 B2* | 2/2018 | Dai | ...................... | B60W 10/30 |
| 9,975,549 B2* | 5/2018 | Dai | ...................... | B60W 10/06 |
| 10,467,898 B2* | 11/2019 | He | ..................... | G08G 1/09626 |
| 10,654,472 B2* | 5/2020 | Dai | ...................... | G08G 1/164 |
| 10,902,336 B2* | 1/2021 | Lassoued | ............... | G06N 5/048 |
| 11,001,273 B2* | 5/2021 | Duale | .................. | B60W 40/09 |
| 11,068,728 B2* | 7/2021 | Welland | ............... | G06N 20/00 |
| 11,407,428 B2* | 8/2022 | Salles | ............... | B60W 60/0051 |
| 11,420,636 B2* | 8/2022 | Oba | ..................... | B60W 40/08 |
| 11,471,115 B2* | 10/2022 | Rance | .................... | G08B 21/22 |
| 11,738,757 B2* | 8/2023 | Oba | ..................... | B60W 50/14 340/576 |
| 12,017,659 B2* | 6/2024 | Mukundan | ............. | G08G 1/166 |
| 2005/0030190 A1* | 2/2005 | Turner | ................... | G08B 19/00 340/691.1 |

(Continued)

FOREIGN PATENT DOCUMENTS

JP 2018206249 A 12/2018
WO 2019240070 A1 12/2019

*Primary Examiner* — Hoi C Lau
(74) *Attorney, Agent, or Firm* — Hunton Andrews Kurth LLP

(57) ABSTRACT

Provided is an information processing device including a control unit that: stores a plurality of first notifications for prompting a safety action in association with the safety action to be taken by a user; selects one first notification from among the plurality of the first notifications when a determination is made to prompt the user to take the safety action in accordance with a behavior of the user; and outputs a presentation instruction for the selected one first notification.

4 Claims, 4 Drawing Sheets

(56) References Cited

U.S. PATENT DOCUMENTS

| | | | |
|---|---|---|---|
| 2010/0302022 A1* | 12/2010 | Saban | B60N 2/002 |
| | | | 340/459 |
| 2014/0139341 A1* | 5/2014 | Green | A61B 5/163 |
| | | | 340/576 |
| 2014/0279707 A1* | 9/2014 | Joshua | G06Q 30/0283 |
| | | | 701/1 |
| 2015/0266455 A1* | 9/2015 | Wilson | G05D 1/0276 |
| | | | 701/93 |
| 2016/0046298 A1* | 2/2016 | DeRuyck | B60K 28/066 |
| | | | 340/576 |
| 2017/0183002 A1* | 6/2017 | Dai | B62D 15/025 |
| 2017/0186321 A1* | 6/2017 | Dai | G08G 1/096725 |
| 2017/0327146 A1* | 11/2017 | Dai | G06V 20/597 |
| 2018/0308353 A1* | 10/2018 | He | A61B 5/18 |
| 2019/0311404 A1* | 10/2019 | Wasserman | G08G 1/096716 |
| 2021/0188289 A1* | 6/2021 | Oba | G08G 1/00 |
| 2022/0225948 A1* | 7/2022 | Rance | A61B 5/0022 |
| 2023/0249693 A1* | 8/2023 | Mukundan | G06V 20/58 |
| | | | 340/425.5 |
| 2023/0282091 A1* | 9/2023 | Padani | G08B 21/14 |
| | | | 340/584 |
| 2023/0298457 A1* | 9/2023 | Kashimura | G08G 1/005 |
| | | | 340/944 |
| 2024/0081646 A1* | 3/2024 | Rance | A61B 5/6802 |
| 2024/0212497 A1* | 6/2024 | Matsuoka | G08G 1/096775 |

* cited by examiner

INFORMATION PROCESSING DEVICE FOR SELECTING NOTIFICATION TO PROMPT SAFETY ACTION PERFORMED BY USER IN ACCORDANCE WITH USER BEHAVIOR

CROSS-REFERENCE TO RELATED APPLICATION

This application claims priority to Japanese Patent Application No. 2022-043227 filed on Mar. 17, 2022, incorporated herein by reference in its entirety.

BACKGROUND

1. Technical Field

The present disclosure relates to an information processing device, a method, and a storage medium.

2. Description of Related Art

Technology related to traffic safety education is conventionally known. For example, WO 2019/240070 discloses technology for determining that a predetermined operation has been performed based on the operation of a moving person.

SUMMARY

There was room for improvement in the technology related to traffic safety education.

An object of the present disclosure, made in view of such circumstances, is to improve the technology related to traffic safety education.

An information processing device according to an embodiment of the present disclosure is an information processing device including a control unit that: stores a plurality of first notifications for prompting a safety action in association with the safety action to be taken by a user; selects one first notification from among the plurality of the first notifications when a determination is made to prompt the user to take the safety action in accordance with a behavior of the user; and outputs a presentation instruction for the selected one first notification.

A method according to an embodiment of the present disclosure is a method executed by an information processing device. The method includes: storing a plurality of first notifications for prompting a safety action in association with the safety action to be taken by a user; selecting one first notification from among the plurality of the first notifications when a determination is made to prompt the user to take the safety action in accordance with a behavior of the user; and outputting a presentation instruction for the selected one first notification.

In a storage medium storing a program according to an embodiment of the present disclosure, the program causes an information processing device to execute: storing a plurality of first notifications for prompting a safety action in association with the safety action to be taken by a user; selecting one first notification from among the plurality of the first notifications when a determination is made to prompt the user to take the safety action in accordance with a behavior of the user; and outputting a presentation instruction for the selected one first notification.

According to the embodiment of the present disclosure, the technology related to traffic safety education is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described.

Outline of Embodiment

Figure 1:
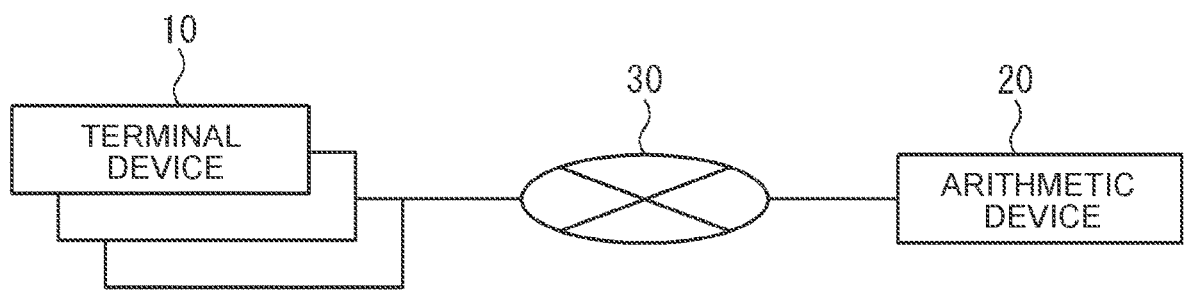
FIG. 1 is a block diagram showing a schematic configuration of a system according to an embodiment of the present disclosure.

The outline of a system 1 according to an embodiment of the present disclosure will be described with reference to FIG. 1. The system 1 includes a terminal device 10 and an arithmetic device 20. The terminal device 10 and the arithmetic device 20 are communicably connected via a network 30 including, for example, the Internet and a mobile communication network.

The terminal device 10 is any information processing device that can be used by a user. For example, as the terminal device 10, a wearable device that the user carries, a general-purpose device such as a smartphone or a personal computer (PC) may be used. A "wearable device" is specifically a mobile device that can be worn at any position on a user's clothing or body, such as a badge type, a wristwatch type, or a clothing type device. In the present embodiment, the terminal device 10 is a badge-type wearable device that is worn at the position on the temporal side of a cap when the cap is worn by the user. However, the present disclosure is not limited to these examples, and any general-purpose device can be mounted at any position. The user of the terminal device 10 is typically a child (e.g., a seven-year-old child) in the present embodiment, but is not limited thereto.

The arithmetic device 20 is any information processing device such as one or a plurality of server devices capable of communicating with each other.

First, the outline of the present embodiment will be described, and the details will be described later. The information processing device according to the present embodiment is the terminal device 10. The terminal device 10 stores a plurality of first notifications for prompting safety actions in association with safety actions that the user should take. The "safety action" refers to the action of protecting the user, and includes, for example, the user looking both ways before crossing the road. When the terminal device 10 determines to prompt the user to take safety actions in accordance with the behavior of the user, the terminal device 10 selects one first notification from the plurality of first notifications. The terminal device 10 outputs a presentation instruction for the selected one first notification.

As described above, according to the present embodiment, one first notification is selected as a notification to be presented to the user from among the plurality of first notifications for prompting safety actions in accordance with the behavior of the user. In the following, presenting the notification to prompt a safety action is also referred to as "alert". If the same notification is selected each time as the first notification presented to the user, as in the prior art, the user becomes accustomed to or bored with the notification, and the user's attention to the alert gradually declines. As a result, the probability of a user taking safety actions tends to decrease over time. However, according to the present embodiment, it becomes easier to avoid selecting the same notification each time as the first notification presented to the user. Therefore, technology related to traffic safety education is improved in that it is easier to maintain the user's attention to the alert and to increase the probability of the user taking safety actions.

Next, each configuration of the system 1 will be described in detail.

Configuration of Terminal Device

Figure 2:
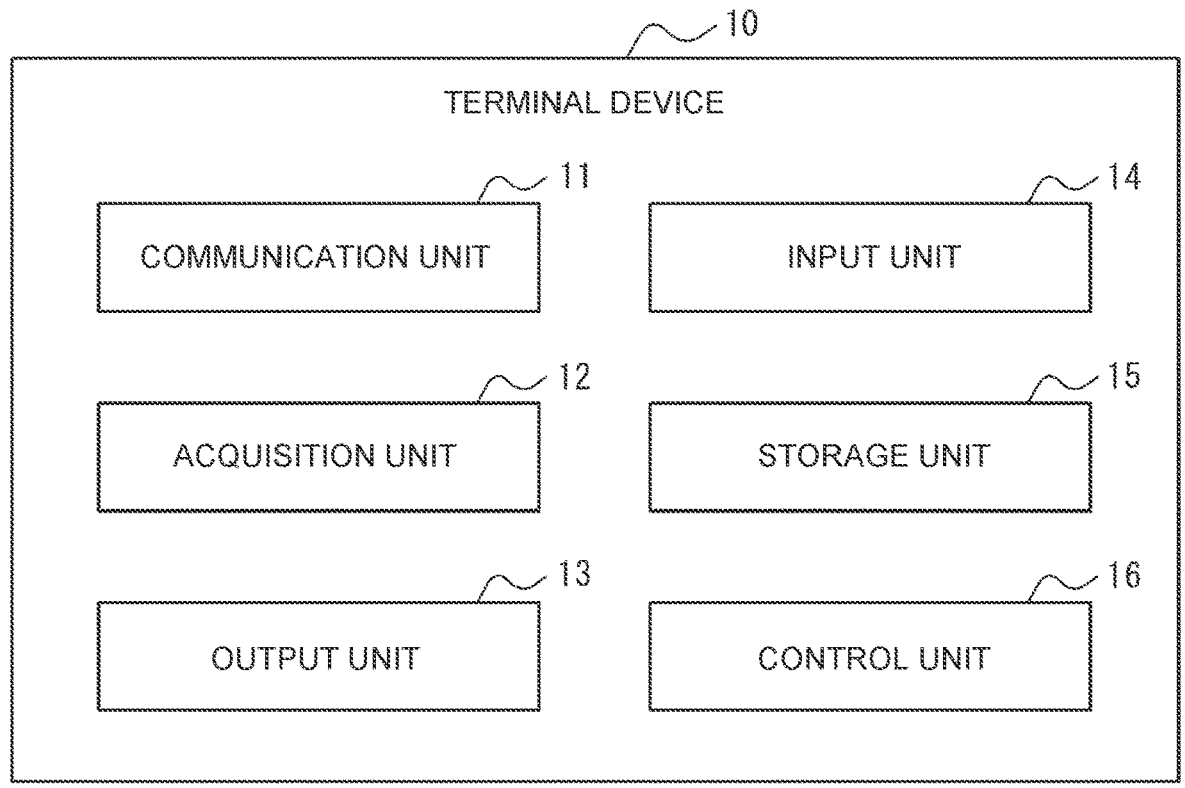
FIG. 2 is a block diagram showing a schematic configuration of a terminal device.

As shown in FIG. 2, the terminal device 10 includes a communication unit 11, an acquisition unit 12, an output unit 13, an input unit 14, a storage unit 15, and a control unit 16.

The communication unit 11 may include one or more communication interfaces connected to the network 30. The communication interface conforms to, for example, a mobile communication standard such as 4th Generation (4G) and 5th Generation (5G), a wired local area network (LAN) standard, or a wireless LAN standard, but is not limited thereto, and may conform to any communication standard. In the present embodiment, the terminal device 10 is connected to the network 30 via the communication unit 11. The terminal device 10 may communicate with, for example, a general-purpose device such as a smartphone or a personal computer (PC) carried by a user (hereinafter also referred to as "a second user") different from the user of the terminal device 10 (hereinafter also referred to as "a first user") via the communication unit 11 and the network 30.

The acquisition unit 12 includes one or more devices for acquiring the position information of the user of the terminal device 10. Specifically, the acquisition unit 12 includes, for example, a receiver conforming to a global positioning system (GPS), but is not limited thereto, and may include a receiver conforming to any satellite positioning system. The acquisition unit 12 also includes any sensor module capable of acquiring information indicating the behavior of the user holding the terminal device 10. The "behavior of the user" includes, for example, looking both ways, stopping, walking while facing forward in the traveling direction, walking while facing backward in the traveling direction, and running. Specifically, the sensor module includes a camera, an infrared sensor, a velocity sensor, an angular velocity sensor, an acceleration sensor, a geomagnetic sensor, or a combination thereof.

The output unit 13 includes one or more output devices for outputting information and notifying the user. The output device is, for example, a speaker for outputting information by voice, a display for outputting information by video, or a driving device for providing a user with a sensible stimulus such as vibration, but is not limited thereto.

The input unit 14 includes one or more input devices that detect user input. The input device is, for example, a physical key, a capacitance key, a touch screen provided integrally with the display of the output unit 13, a microphone for receiving voice input, a camera, and the like, but is not limited thereto.

The storage unit 15 includes one or more memories. The memories are, for example, a semiconductor memory, a magnetic memory, or an optical memory, but are not limited to these memories. Each memory included in the storage unit 15 may function as, for example, a main storage device, an auxiliary storage device, or a cache memory. The storage unit 15 stores any information used for the operation of the terminal device 10. For example, the storage unit 15 may store system programs, application programs, embedded software, databases, map information, and the like. The information stored in the storage unit 15 may be updatable with information received from the network 30 via the communication unit 11, for example.

In the present embodiment, the storage unit 15 stores a notification database and an action history database.

The notification database includes notification data having a "first notification", a "first notification ID", and a "safety action ID". The notification database may further include notification data having a "second notification" and a "second notification ID".

The "first notification" is the data of the notification corresponding to the alert.

The "first notification ID" is information that uniquely identifies the first notification.

The "safety action ID" is information that uniquely identifies a safety action associated with the first notification identified by the first notification ID.

The "second notification" is notification data for presenting a negative determination result to the user and prompting the user to take a safety action next time.

The "second notification ID" is information that uniquely identifies the second notification.

The action history database includes action history data having "position information" and "action history".

The "position information" is information indicating the position of the user on the map.

The "action history" is information indicating the action history of the user. Specifically, the "action history" includes information indicating the presented first notification and information indicating the result of the determination of whether the user has taken a safety action after the output of the presentation instruction of the first notification (hereinafter referred to as "action determination"). The information indicating the presented first notification is the "first notification ID" of the notification data described above in the present embodiment, but is not limited to this and may include any information. The result of the action determination is identified by ON or OFF of the "safety action flag" in the present embodiment, but is not limited to this, and any method can be adopted. In the present embodiment, ON indicates that a safety action by the user has been detected, and OFF indicates that no safety action by the user has been detected. The safety action is identified by the "safety action ID" of the notification data described above in the present embodiment, but is not limited to this and can be identified by any method. Further, the "action history" may include information indicating the second notification presented after the action determination. The information indicating the second notification presented after the action determination is the "second notification ID" of the notification data described above in the present embodiment, but is not limited to this and may include any information.

The control unit 16 includes one or more processors, one or more programmable circuits, one or more dedicated circuits, or a combination of these. The processor is, for example, a general-purpose processor such as a central processing unit (CPU) or a graphics processing unit (GPU), or a dedicated processor specialized for a specific process, but is not limited to these. The programmable circuit is, for example, a field-programmable gate array (FPGA), but is not limited to this. The dedicated circuit is, for example, an application specific integrated circuit (ASIC), but is not limited to this. The control unit 16 controls the operation of the terminal device 10 as a whole. Details of the operation of the terminal device 10 controlled by the control unit 16 will be described later.

Configuration of Arithmetic Device

Figure 3:
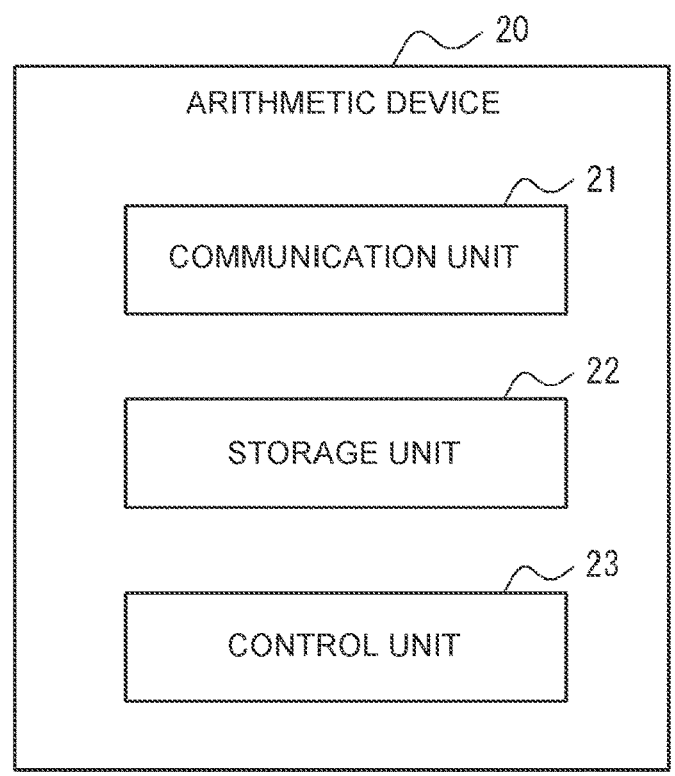
FIG. 3 is a block diagram showing a schematic configuration of an arithmetic device.

As shown in FIG. 3, the arithmetic device 20 includes a communication unit 21, a storage unit 22, and a control unit 23.

The communication unit 21 includes one or more communication interfaces connected to the network 30. The communication interface conforms to, for example, a mobile communication standard, a wired LAN standard, or a wireless LAN standard. However, the standards are not limited to these, and the communication interface may conform to any communication standard. In the present embodiment, the arithmetic device 20 communicates with the terminal device 10 via the communication unit 21 and the network 30. The arithmetic device 20 may communicate with, for example, a general-purpose device such as a smartphone or a PC carried by a user (that is, the second user) different from the user of the terminal device 10 (that is, the first user) via the communication unit 21 and the network 30.

The storage unit 22 includes one or more memories. Each memory included in the storage unit 22 may function as, for example, a main storage device, an auxiliary storage device, or a cache memory. The storage unit 22 stores any information used for the operation of the arithmetic device 20. For example, the storage unit 22 may store system programs, application programs, embedded software, databases, map information, and the like. The information stored in the storage unit 22 may be updatable with information received from the network 30 via the communication unit 21, for example.

The control unit 23 includes one or more processors, one or more programmable circuits, one or more dedicated circuits, or a combination of these. The control unit 23 controls the operation of the arithmetic device 20 as a whole.

Operation Flow of System

Figure 4:
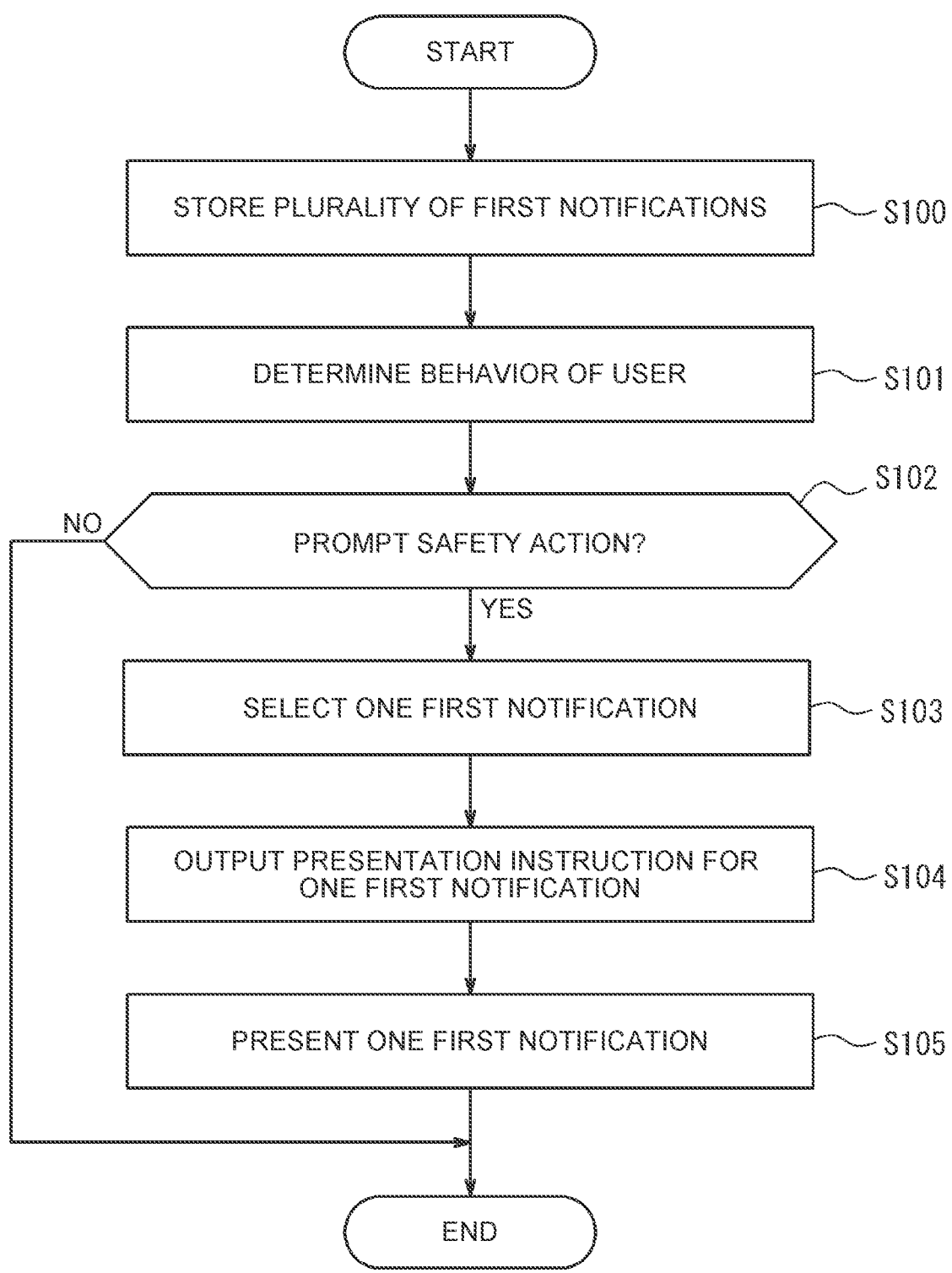
FIG. 4 is a flowchart showing an operation of a system according to a first embodiment.

With reference to FIG. 4, the operation of the system 1 according to the first embodiment will be described. The operation in FIG. 4 corresponds to the method according to the present embodiment. The operation in FIG. 4 shows the operation of the terminal device 10. The operation in FIG. 4 is repeatedly executed, for example, at a predetermined period. The predetermined period can be determined to be any period.

Step S100

The control unit 16 of the terminal device 10 stores the plurality of first notifications for prompting safety actions in association with safety actions that the user should take.

Specifically, the control unit 16 first sets a safety action that the user should take in accordance with the behavior of the user. Different behavior of the user may lead to different safety actions that the user should take. The behavior of the user will be described later in step S101. Any method can be adopted for setting safety actions and associating them with the plurality of first notifications. For example, the following method can be adopted.

As a first example, the control unit 16 sets safety actions that the user should take at one or more checkpoints on the map indicated by the map information. In this case, the control unit 16 sets safety actions that the user should take at one or more checkpoints on the map indicated by the map information. The "checkpoint" refers to a point that can easily cause danger to the user from the viewpoint of traffic safety, and includes, for example, an intersection or a point of frequent traffic accidents. In other words, the checkpoint is a point where some safety action is required to ensure the safety of the user. For example, the control unit 16 sets "looking both ways" as a safety action that the user should take at a checkpoint set at an intersection. The control unit 16 adds the safety action ID "A1" of the safety action "looking both ways" to the notification data. Note that in the present embodiment, the one or more checkpoints may include at least one of a first checkpoint that is set without being based on the input of the user (that is, the second user) different from the user of the terminal device 10 (that is, the first user) and a second checkpoint that is set based on the input of the second user. The second user is typically a parent of the user, but is not limited to this. The first checkpoint can be set based on information such as traffic volume, accident information, or vehicle travel data, but is not limited thereto, and can be set based on any information. The traffic volume or the accident information is, for example, data related to traffic information provided by the Japan Road Traffic Information Center via the network 30, but is not limited thereto, and may be any data. The travel data of the vehicle is, for example, data generated based on data communication module (DCM) data collected via the network 30 from vehicles traveling on points on the map in order to specify points where dangerous driving is likely to occur, such as sudden braking or stop violation, but is not limited thereto, and may be any data. Any method can be adopted to set the second checkpoint. For example, the second user may cause the display of a smartphone carried by the second user to display the map information and operate the touch panel to set a desired point (e.g., a point on the first user's commuting street) different from the first checkpoint on the map indicated by the map information as the second checkpoint. The second user may transmit information indicating the set second checkpoint to the arithmetic device 20 via the communication unit of the smartphone. The arithmetic device 20 may transmit, to the terminal device 10, data in which the received information indicating the second checkpoint and the map information stored in the storage unit 22 are associated with each other. The terminal device 10 may update the map information stored in the storage unit 15 with the received data.

As a second example, the control unit 16 sets a safety action that the user should take when an unsafety action by the user is detected. In this case, the control unit 16 sets a safety action that the user should take when an unsafety action by the user is detected. The "unsafety action" is behavior that can endanger the user. In the second example, first, the control unit 16 sets an unsafety action to be detected. For example, the control unit 16 sets actions such as "the user is moving in a direction different from the direction of the user" or "running near the road" as unsafety actions. A typical example of the former case is that the user is walking while looking aside or walking backwards. Next, for each of the set unsafety actions, the control unit 16 sets a safety action that the user should take when the unsafety action is detected. For example, the control unit 16 determines "walking while looking forward" as a safety action to be taken by the user when an unsafety action of "the user is moving in a direction different from the direction of the user" is detected. The control unit 16 adds the safety action ID "A2" of the safety action "walking while looking forward" to the notification data.

Next, the control unit 16 sets a plurality of first notifications for prompting the safety actions that the user should take and that are set as in the first example or the second example described above. That is, in the present embodiment, a plurality of options of the first notification (hereinafter also referred to as "one set of first notifications") is set for one safety action. The one set of first notifications may be a voice, a text message, an image, vibration, or a combination thereof, but is presented in the form of a voice (hereinafter also referred to as a "first voice") corresponding to the alert in the present embodiment. The first voice may be any voice, such as a synthetic voice or a recorded voice. In the present embodiment, a plurality of sets of first notifications corresponding to each of the plurality of safety actions is set, and the plurality of sets of first notifications corresponds to the plurality of first notifications of the present embodiment. However, the number of safety actions to be set is not limited to plural and may be one. In that case, the one set of first notifications corresponding to the one safety action corresponds to the plurality of first notifications of the present embodiment.

In the first example described above, the control unit 16 sets the one set of voices including a message for prompting the user to take safety actions in the surrounding area of one checkpoint as the one set of first notifications. The "surrounding area" is an area where the distance between the checkpoint and the user is less than a predetermined threshold value. The distance between the checkpoint and the user can be calculated by any method. For example, the control unit 16 may calculate the distance between the position of the user on the map indicated by the map information and each of the one or more checkpoints on the map, and calculate the smallest calculated distance between at least one checkpoint and the user as the distance D. When the distance D is less than the predetermined threshold value, the control unit 16 may estimate that the user is within the surrounding area of the at least one checkpoint. The predetermined threshold value may be the same value as or different from the threshold value Dth that serves as a reference for "approach determination" executed in step S102 described later. In the former case, the surrounding area is defined based on the threshold value Dth (e.g., 5 m radius). Specifically, an area in which a distance from the checkpoint is less than the threshold value Dth (for example, an area with a radius of less than 5 m from the checkpoint) may correspond to the surrounding area. On the other hand, in the latter case, the surrounding area is defined using values greater or less than the threshold value Dth. For example, an area in which a distance from the checkpoint is greater than (e.g., 6 m radius) or smaller than (e.g., 2 m radius) the threshold value Dth (e.g., 5 m radius) may correspond to the surrounding area. Also, for example, one set of first voices A, B, C, and D corresponding to a checkpoint set at an intersection may each include a message of "look both ways" to prompt a safety action of "looking both ways". The control unit 16 adds, to the notification data, information in which the one set of first voices that is set and the safety action identified by the safety action ID are associated with each other. The control unit 16 repeats this operation for each checkpoint.

In the second example described above, the control unit 16 sets one set of voices including a message corresponding to one unsafety action as the one set of first notifications. For example, the one set of first voices A, B, C, and D corresponding to the unsafety action of "the user is moving in a direction different from the direction of the user" may each include a message of "walk while looking forward" to prompt a safety action of "walking while looking forward". The control unit 16 adds, to the notification data, information in which the one set of first voices that is set and the safety action identified by the safety action ID are associated with each other. The control unit 16 repeats this operation for each unsafety action.

In this way, the control unit 16 stores a plurality of first notifications for prompting safety actions in association with the safety actions that the user should take.

In the present embodiment, the one set of first voices is described as four types of voices (first voices A, B, C, and D) including the same message for each corresponding safety action and having different physical feature amounts such as frequency components that characterize the pitch or volume of the voice. Specifically, the first voice A is a synthetic voice imitating the voice of an adult male (hereinafter also referred to as "male synthetic voice") having the first notification ID "1-1". The first voice B is a synthetic voice imitating the voice of an adult female (hereinafter also referred to as "female synthetic voice") having the first notification ID "1-2". The first voice C is the voice of an animation character (hereinafter also referred to as "character voice") having the first notification ID "1-3". The first voice D is the recorded voice of a parent of the user (hereinafter also referred to as the "recorded voice of a parent") having the first notification ID "1-4". In the present embodiment, using these four types of voices with different physical feature amounts, the one set of voices including the same message for each corresponding safety action is set as the one set of first voices. The messages of the one set of first voices are different for different corresponding safety actions. However, the setting of the plurality of first notifications is not limited to these examples, and any method can be adopted. For example, the plurality of sets of first voices corresponding to the plurality of first notifications does not necessarily strictly include the same message for each corresponding safety action, and may include conceptually equivalent or synonymous messages.

Step S101

The control unit 16 determines the behavior of the user.

Specifically, the control unit 16 determines the behavior of the user by acquiring information indicating the behavior of the user in addition to the position information of the user via the acquisition unit 12.

In the first example described above, the information indicating the behavior of the user is information indicating how the user is moving, that is, information indicating the movement route of the user on the map indicated by the map information. In this case, the control unit 16 may specify the movement route of the user on the map by analyzing the position information of the user obtained via the acquisition unit 12. Then, the control unit 16 may acquire information indicating the specified movement route as the information indicating the behavior of the user. The control unit 16 stores the acquired information indicating the behavior of the user in the storage unit 15.

In the second example described above, the information indicating the behavior of the user is information indicating whether the user is taking an unsafety action. For example, an unsafety action is "the user is moving in a direction different from the direction of the user". In this case, the control unit 16 may determine whether the user is taking an unsafety action by analyzing the direction of the user and the traveling direction. Any method can be adopted for the analysis of the direction of the user and the traveling direction. For example, by analyzing signals of the angular velocity sensor and/or the geomagnetic sensor of the acquisition unit 12, the control unit 16 may acquire the direction information indicating the direction of the user. The control unit 16 may acquire the position information of the user as well as the direction information, and specify the traveling direction of the user from the user's movement route on the map, which is obtained by analyzing the acquired position information. Additionally or alternatively, the control unit 16 may specify the traveling direction of the user by analyzing signals of the acceleration sensor of the acquisition unit 12. The control unit 16 may determine whether the user is taking an unsafety action based on the acquired direction information and the specified traveling direction of the user. Specifically, the control unit 16 compares the direction of the user indicated by the acquired direction information with the specified traveling direction of the user. As a result of the comparison, when it is determined that the direction of the user and the traveling direction of the user is not substantially the same, the control unit 16 determines that the user is moving in a direction different from the direction of the user. On the other hand, when it is determined that the direction of the user and the traveling direction of the user is substantially the same, the control unit 16 determines that the user is not moving in a direction different from the direction of the user. "The direction of the user and the traveling direction of the user being substantially the same" means that the direction of the user and the traveling direction of the user define a predetermined angle difference or less (e.g., 90° or less). The predetermined angle difference can be set to any angle in accordance with the mounting position of the terminal device 10. However, the determination as to whether the user is moving in a direction different from the direction of the user is not limited to these examples, and any method can be adopted. Also, for example, the unsafety action may be "running near the road". In this case, the control unit 16 may acquire information indicating the velocity and the acceleration of the user via the acquisition unit 12, in addition to the direction information and the position information. The control unit 16 may determine whether the user has started running by analyzing the acquired information. Then, the control unit 16 may acquire the determination result as to whether the user is taking an unsafety action as the information indicating the behavior of the user. The control unit 16 stores the acquired information indicating the behavior of the user in the storage unit 15.

In this way, the control unit 16 determines the behavior of the user based on the information acquired via the acquisition unit 12. However, the determination of the behavior of the user is not limited to these examples, and any method can be adopted.

Step S102

The control unit 16 determines whether to prompt the user to take a safety action. When it is determined to prompt the user to take a safety action (step S102: Yes), the process proceeds to step S103. On the other hand, when it is determined not to prompt the user to take a safety action (step S102: No), the process ends.

Specifically, the control unit 16 determines whether the behavior of the user determined in step S101 satisfies a predetermined condition. When it is determined that the behavior of the user satisfies the predetermined condition, the control unit 16 determines to prompt the user to take a safety action corresponding to the behavior. On the other hand, when it is determined that the behavior of the user does not satisfy the predetermined condition, the control unit 16 terminates the process. A specific example of the predetermined condition will be described below.

In the first example described above, the predetermined condition is that the user has approached at least one checkpoint. The control unit 16 determines whether the user has approached the at least one checkpoint by analyzing the user's movement route on the map, which is acquired in step S101. Any method can be adopted to determine whether the user has approached the at least one checkpoint (hereinafter also referred to as "approach determination"). For example, when it is detected that the distance D calculated in step S100 is less than the threshold value Dth (for example, a radius of 5 m), the control unit 16 may determine that the user has approached the at least one checkpoint. In this case, the control unit 16 determines that the behavior of the user satisfies the predetermined condition. Then, the control unit 16 determines to prompt the user to take a safety action corresponding to the behavior. For example, when the at least one checkpoint is an intersection, the control unit 16 determines to prompt the user to take a safety action corresponding to the user's approach to the checkpoint, that is, "looking both ways".

In the second example described above, the predetermined condition is that at least one unsafety action by the user has been detected. When the determination result acquired in step S101 indicates that the at least one unsafety action by the user has been detected, the control unit 16 determines that the behavior of the user satisfies the predetermined condition. Then, the control unit 16 determines to prompt the user to take a safety action corresponding to the behavior. For example, when the unsafety action is "the user is moving in a direction different from the direction of the user", the control unit 16 determines to prompt the user to take a safety action corresponding to the detected unsafety action, that is, "walking while looking forward".

Step S103

When it is determined to prompt the user to take a safety action (step S102: Yes), the control unit 16 selects one first notification from among the plurality of first notifications.

Specifically, the control unit 16 searches the notification database based on the first notification ID, and selects one first voice from among the one set of first voices corresponding to the safety action determined in step S102. In the present embodiment, the control unit 16 selects one first voice with equal probability from among the first voices A, B, C, and D corresponding to the safety action determined in step S102. However, any method can be adopted for selecting one first voice. For example, one first voice may be selected sequentially or randomly each time step S103 is executed. In either case, it becomes easier to suppress the user from getting bored of being presented with the same notification each time. As a result, it becomes easier to maintain the user's attention to the alert and increase the probability of the user taking a safety action.

In this way, through steps S101 to S103, the control unit 16 selects one first notification from among the plurality of first notifications when the control unit 16 has determined to prompt the user to take a safety action in accordance with the behavior of the user.

Step S104

The control unit 16 outputs a presentation instruction for the one first notification selected in step S103.

Specifically, the control unit 16 transmits, to the output unit 13, a playback instruction instructing to play the one first voice selected in step S103.

Step S105

The control unit 16 presents the one first notification selected in step S103 via the output unit 13. After that, the process ends.

Specifically, the control unit 16 plays the first voice selected in step S103 toward the user via the output unit 13. For example, in the first example described above, assume that the first voice A (male synthetic voice) of "look both ways" is selected in step S103. In this case, the control unit 16 plays the first voice A toward the user via the output unit 13. Also, for example, in the second example described above, assume that the first voice B (female synthetic voice) of "walk while looking forward" is selected in step S103. In this case, the control unit 16 plays the first voice B toward the user via the output unit 13.

Thus, according to the first embodiment, a plurality of first notifications, that is, one set of first notifications is set for each safety action, and one first notification is selected from among one set of first notifications in accordance with the behavior of the user. This makes it possible to reduce the possibility that the same notification is selected each time as the first notification presented to the user. Therefore, it becomes easier to maintain the user's attention to the alert and increase the probability of the user taking a safety action.

Figure 5:
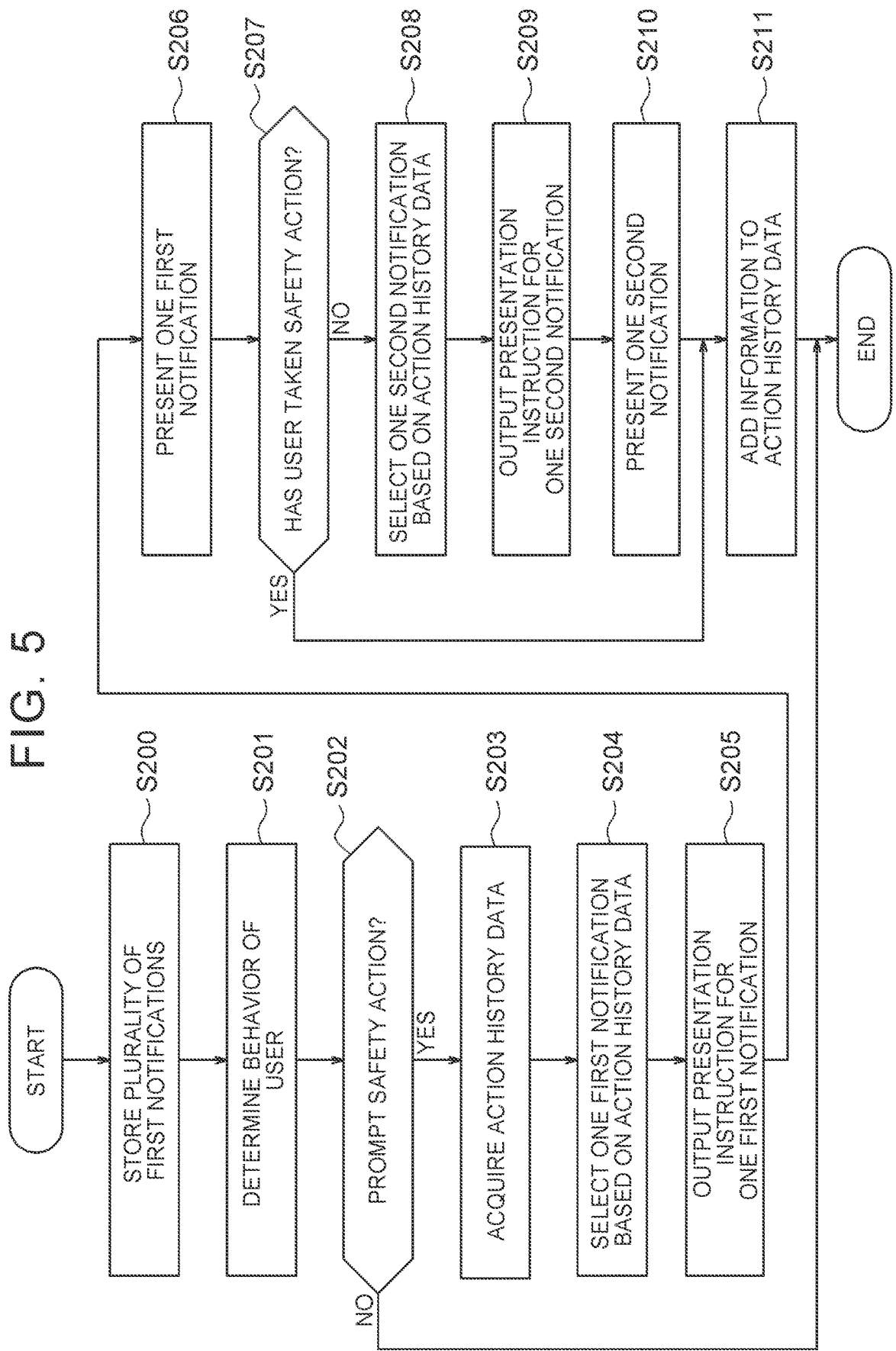
FIG. 5 is a flowchart showing an operation of a system according to a second embodiment.

Next, with reference to FIG. 5, the operation of the system 1 according to a second embodiment will be described. The operation in FIG. 5 corresponds to the method according to the present embodiment. The operation in FIG. 5 shows the operations of the terminal device 10 and the arithmetic device 20. The operation in FIG. 5 is repeatedly executed, for example, at a predetermined period. The predetermined period can be determined to be any period. Since the processes from step S200 to step S202 are the same as the processes from step S100 to step S102 described in the first embodiment, the description thereof will be omitted. In addition, since the configuration is the same as that in the first embodiment in that a plurality of sets of first voices presented in the form of a voice corresponding to the alert (that is, first voices) corresponds to a plurality of first notifications, the description thereof will be omitted. In the following, the processes from step S203 and after that are executed when it is determined to prompt a safety action through the determination in step S202, which are mainly the difference from the first embodiment, will be described.

Step S203

When it is determined in step S202 to prompt the user to take a safety action (step S202: Yes), the control unit 16 acquires the action history data of the user.

Specifically, the control unit 16 refers to the action history database stored in the storage unit 15 and acquires the action history data of the user. In the present embodiment, the action history data includes information indicating the first voice that was played from among the plurality of first voices corresponding to the plurality of first notifications (that is, the first voice with a playback record), and information indicating the result of determination as to whether the user has taken a safety action after the output of the playback instruction of the first voice (that is, action determination). In the present embodiment, the action history data further includes information indicating the safety action ID of the safety action to be determined and the playback time of the first voice. For example, the action history data includes the first notification ID "1-1" of the first voice A, the safety action flag "OFF" as a result of determination as to whether the user took a safety action after the output of the playback instruction of the first voice A, the safety action ID "A1", and information indicating the playback time of the first voice A. However, the action history data is not limited to these examples and may include any information.

The action history data is stored in the storage unit 15 in the present embodiment, but may be stored in an external storage such as the storage unit 22 of the arithmetic device 20. In this case, the control unit 16 transmits these pieces of information to the communication unit 21 of the arithmetic device 20 via the communication unit 11. The control unit 23 of the arithmetic device 20 stores the information received via the communication unit 21 in the storage unit 22. Using such information, the control unit 23 may separately generate data indicating the user's (first user's) movement route on the map indicated by the map information and the safety action history. In this case, the control unit 23 may transmit the above data to the smartphone of the second user, for example, in response to a request from the smartphone of the second user (for example, a parent of the first user) different from the first user. On the smartphone of the second user, the received history data may be applied to the map displayed on the display so that the second user can see the movement route and the history of the safety action of the first user. Furthermore, from the viewpoint of ensuring the safety of the first user, the second user can operate the smartphone as necessary to add or delete the second checkpoint.

Step S204

The control unit 16 selects one first notification based on the action history data acquired in step S203.

Specifically, for each of the one set of first voices corresponding to the safety action determined in step S202, the control unit 16 calculates, based on the action history data, the probability that the user has taken a safety action after the first voice was played (hereinafter also referred to as "first success rate"). Any method can be adopted to calculate the first success rate. For example, the control unit 16 may refer to the action history data to acquire the cumulative number of times the first voice was played within a predetermined period (for example, the past month) and the number of safety actions taken by the user after the first voice was played for each of the one set of first voices corresponding to the safety action determined in step S202. The control unit 16 may calculate the first success rate from the acquired cumulative number of times played and the number of safety actions. Then, when the control unit 16 selects one first voice corresponding to one first notification from among the one set of first voices corresponding to a plurality of first notifications, the control unit 16 extracts the first voice corresponding to the first notification with the highest first success rate that is calculated. Thus, the control unit 16 can select the first voice corresponding to the one first notification with the highest probability of the user taking a safety action. Therefore, it becomes easier to increase the probability of the user taking a safety action after the presentation of the first notification.

However, in the above example, it is also possible that the one first notification with the highest probability of the user taking a safety action, that is, the same first notification, will be selected each time. In this case, in step S206, which will be described later, the same first notification can be presented to the user each time. As a result, the user may become accustomed to or bored with the notification, and it may be difficult to maintain the user's attention to the alert.

In view of this, the control unit 16 may classify each of the plurality of first notifications into a plurality of groups with different first success rates, and select one first notification from any group with a predetermined probability when selecting one first notification from among the plurality of first notifications. For example, the control unit 16 may classify each of the plurality of first notifications into either one of a first group in which the first success rate is equal to or greater than a threshold value (for example, 80%) and a second group in which the first success rate is less than the threshold value. The number of groups is not limited to two, and may be three or more. When selecting one first notification from among a plurality of first notifications, the control unit 16 may set a first selection rate, which is the probability that the one first notification is selected from the first group, to be higher than a second selection rate, which is the probability that the one first notification is selected from the second group. Accordingly, by adjusting the first selection rate and the second selection rate, it becomes easier to avoid selecting the same first notification each time in step S204. As a result, it is possible to avoid presenting the same notification each time in the subsequent step S206, and it becomes easier to suppress the user from becoming accustomed or bored. Therefore, it becomes easier to maintain the user's attention to the alert and further increase the probability of the user taking a safety action. Further, when selecting one first notification from among a plurality of first notifications included in any one group, in the present embodiment, one first notification is selected with equal probability. However, the configuration is not limited to this, and a first notification having a higher first success rate may be more likely to be selected. This makes it easier to further increase the probability of the user taking a safety action while avoiding that the same first notification is selected every time in step S204.

In this way, when selecting one first notification from among a plurality of first notifications, the control unit 16 selects one first notification based on the action history data.
Step S205

The control unit 16 outputs a presentation instruction for the one first notification selected in step S204.

Specifically, the control unit 16 transmits, to the output unit 13, a playback instruction instructing to play the one first voice selected in step S204.
Step S206

The control unit 16 presents the one first notification selected in step S204 via the output unit 13. After that, the process ends.

Specifically, the control unit 16 plays the first voice selected in step S204 toward the user via the output unit 13. For example, in the first example described above, assume that the first voice A (male synthetic voice) of "look both ways" is selected in step S204. In this case, the control unit 16 plays the first voice A toward the user via the output unit 13. Also, for example, in the second example described above, assume that the first voice B (female synthetic voice) of "walk while looking forward" is selected in step S204. In this case, the control unit 16 plays the first voice B toward the user via the output unit 13.
Step S207

The control unit 16 determines whether the user has taken a safety action. When it is determined that the user has taken a safety action (step S207: Yes), the process proceeds to step S211. On the other hand, when it is determined that the user has not taken a safety action (step S207: No), the process proceeds to step S208. The operation of step S207 corresponds to the action determination in the present embodiment.

Specifically, the control unit 16 determines whether the user has taken the safety action determined in step S202. Any method can be adopted for determining whether a safety action has been taken, that is, for the action determination.

For example, in the first example described above, the control unit 16 refers to the information indicating the behavior of the user acquired in step S201 to determine whether the at least one checkpoint determined to be approached by the user is detected. When the at least one checkpoint is detected, the control unit 16 determines whether a corresponding safety action (e.g., looking both ways) is detected within the surrounding area of the checkpoint. Any method can be used to determine whether a corresponding safety action is detected. For example, the control unit 16 may determine whether a corresponding safety action (e.g., looking both ways) is detected by analyzing the signals of the angular velocity sensor and/or the geomagnetic sensor of the acquisition unit 12, and acquiring information indicating the user's motion (for example, whether the user's head is shaken right and left). When the corresponding safety action is detected, the control unit 16 determines that the user has taken the safety action.

Further, for example, in the second example described above, the control unit 16 refers to the information indicating the behavior of the user acquired in step S201 to determine whether the state where the user is taking an unsafety action (for example, "the user is moving in a direction different from the direction of the user") is detected. When it is detected that the user is taking an unsafety action, the control unit 16 determines whether a safety action (for example, "walking while looking forward") corresponding to the detected unsafety action is detected. Any method can be used to determine whether a safety action corresponding to an unsafety action is detected. For example, the control unit 16 may detect the unsafety action by executing the operation described above in step S101 and analyzing the direction of the first user and the traveling direction. Such an operation may be repeatedly executed, for example, at a predetermined period. The predetermined period can be determined to be any period.
Step S208

The control unit 16 selects one second notification based on the action history data.

Specifically, the storage unit 15 stores a plurality of second notifications different from the plurality of first notifications in the notification database together with the second notification IDs. The plurality of second notifications is another one set of notifications (hereinafter also referred to as "one set of second notifications") set in association with the one set of first notifications corresponding to the safety action determined in step S202. The one set of second notifications may be a voice, a text message, an image, vibration, or a combination thereof, but is presented in the form of a voice (hereinafter also referred to as a "second voice") for presenting a negative determination result to the user and prompting the user to take the safety action next time in the present embodiment. The second voice may be any voice, such as a synthetic voice or a recorded voice. In the present embodiment, a plurality of sets of second notifications corresponding to each of a plurality of sets of first notifications is set, and the plurality of sets of second notifications corresponds to the plurality of second notifications of the present embodiment. However, as described above in step S100, when the number of set safety actions is one, the number of sets of first notifications may be one set instead of multiple sets. In that case, one set of second notifications corresponding to one set of first notifications corresponds to a plurality of second notifications of the present embodiment. The one set of second notifications includes a message different from the one set of first voices corresponding to the safety action determined in step S202, and another one set of voices (i.e., second voices) including a message in response to the one set of first voices can be set. For example, one set of voices including the message "look both ways next time" may be set as the one set of second voices corresponding to the one set of first voices "look both ways". Also, for example, one set of voices including the message "walk while looking forward next time" may be set as the one set of second voices corresponding to the one set of first voices "walk while looking forward". The one set of second voices set in this way is stored in the notification database of the storage unit 15 together with the second notification IDs. Then, the control unit 16 searches the notification database based on the second notification ID, and selects one second voice from among the one set of second voices associated with the one set of first voices corresponding to the safety action determined in step S202.

In the present embodiment, when selecting the one second voice corresponding to the one second notification, the control unit 16 refers to the action history data of the action history database stored in the storage unit 15 to enable selecting the one second voice corresponding to the one second notification with the highest probability of the user taking a safety action in the next action determination. As a specific example, as will be described later in step S211, each time the control unit 16 performs the action determination in step S207, the control unit 16 adds, to the action history data, the information indicating the one first voice corresponding to the one first notification, the information indicating the result of the action determination, and the information indicating the second voice corresponding to the second notification played after the action determination. When selecting the one second voice from the one set of second voices, the control unit 16 refers to the action history data to which the result of the action determination up to the previous time is added, and calculates the probability that the user actually took a safety action in the next action determination after the second voice was played (that is, in the action determination immediately after the second voice was played) (hereinafter also referred to as "second success rate") for each of the one set of second voices. Any method can be adopted to calculate the second success rate. For example, the control unit 16 may refer to the action history data to acquire the cumulative number of times the second voice was played within a predetermined period (for example, the past month) and the number of safety actions determined to be taken by the user in the action determination after the second voice was played (that is, in the action determination immediately after the second voice was played) for each of the second voices selected in step S208. The control unit 16 may calculate the second success rate from the acquired cumulative number of times played and the number of safety actions.

For example, assume that it is determined that the user did not take a safety action in the first action determination (first time of step S207: No), but it is determined that the user has taken a safety action in the second action determination (second time of step S207: Yes). In this case, there is a possibility that the user was influenced not only by the first voice played before the second action determination (second time of step S206), but also by the second voice played after the previous (first) action determination, which caused the user to stop taking the unsafety action and to take the safety action, that is, the user improved his/her action. This possibility increases as the frequency of obtaining similar results increases as the result of action determination is accumulated. Typically, at some point in time, users who show no improvement in actions after playing other second voices may show improvement in actions after playing one certain second voice (e.g., recorded voice of a parent). This indicates that the second success rate tends to increase when the one certain second voice is played. In other words, a stronger causal relationship is recognized between the one certain second voice and the safety action than other second voices. The action history data can also be considered to be data indicating such causal relationships. By referring to the second success rate calculated from the action history data, the control unit 16 can predict the probability of the user taking a safety action in the next action determination. When selecting one second voice from the one set of second voices, the control unit 16 extracts the second voice with the highest second success rate calculated based on the action history data. Thus, the control unit 16 can select one second voice corresponding to one second notification with the highest probability of the user taking a safety action in the next action determination. As a result, it becomes easier to increase the probability of the user taking a safety action in the next action determination. Therefore, it becomes easier to further increase the probability of the user taking safety actions.

In the present embodiment, a plurality of options for the second voice (that is, one set of second voices) are set for each corresponding one set of first voices. In the present embodiment, the one set of second voices is described as four types of voices (second voices E, F, G, and H) including the same message for each corresponding one set of first voices and having different physical feature amounts such as frequency components that characterize the pitch or volume of the voice. Specifically, the second voice E is a male synthetic voice having the second notification ID "2-1". The second voice F is a female synthetic voice having the second notification ID "2-2". The second voice G is the character voice having the second notification ID "2-3". The second voice H is the recorded voice of a parent having the second notification ID "2-4". In the present embodiment, using these four types of voices with different physical feature amounts, the one set of voices including the same message for each corresponding one set of first voices is set as the one set of second voices. When the corresponding one set of first voices is different, the message of the one set of second voices is also different. However, the setting of the plurality of second notifications is not limited to these examples, and any method can be adopted. For example, the plurality of sets of second voices corresponding to the plurality of second notifications does not necessarily strictly include the same message for each corresponding one set of first voices, and may include conceptually equivalent or synonymous messages.

Step S209

The control unit 16 outputs a presentation instruction for the one second notification selected in step S208.

Specifically, the control unit 16 transmits, to the output unit 13, a playback instruction instructing to play the one second voice selected in step S208.

In this way, through steps S207 to S209, the control unit 16 selects one second notification from among a plurality of second notifications after the action determination, and outputs a presentation instruction for the selected one second notification.

Step S210

The control unit 16 presents the one second notification selected in step S208 via the output unit 13. The process then proceeds to step S211.

Specifically, the control unit 16 plays the second voice selected in step S208 toward the user via the output unit 13. For example, in the first example described above, assume that the second voice E (male synthetic voice) of "look both ways next time" is selected in step S208. In this case, the control unit 16 plays the second voice E toward the user via the output unit 13. Also, for example, in the second example described above, assume that the second voice F (female synthetic voice) of "walk while looking forward next time" is selected in step S208. In this case, the control unit 16 plays the second voice F toward the user via the output unit 13.

Step S211

The control unit 16 adds the information to the action history data. After that, the process ends.

Specifically, the control unit 16 adds, to the action history data, one first notification, that is, the first notification ID as the information indicating the one first voice played in step S206, the result of determination, that is, the safety action flag serving as the information indicating the result of the action determination in step S207, and the second notification presented after the determination, that is, the second notification ID as the information indicating the second voice played in step S210 after the action determination.

For example, in the first example described above, assume that the first voice A (male synthetic voice) of "look both ways" is played in step S206. In this case, the control unit 16 adds the first notification ID "1-1" of the first voice A to the action history data together with the safety action ID "A1" of the safety action "looking both ways". It is also assumed that the result of the action determination in step S207 is a positive result (step S207: Yes). In this case, the control unit 16 adds the "ON" safety action flag to the action history data. On the other hand, it is assumed that the result of the action determination in step S207 is a negative result (step S207: No). Then, it is assumed that the second voice F (female synthetic voice) of "look both ways next time" is played in step S210 after the action determination. In this case, the control unit 16 adds the "OFF" safety action flag and the second notification ID "2-2" of the second voice F to the action history data.

Also, for example, in the second example described above, assume that the first voice C (character voice) of "walk while looking forward" is played in step S206. In this case, the control unit 16 adds the first notification ID "1-3" of the first voice C to the action history data together with the safety action ID "A2" of the safety action "walking while looking forward". It is also assumed that the result of the action determination in step S207 is a negative result (step S207: No). In this case, the control unit 16 adds the "OFF" safety action flag to the action history data. Then, it is assumed that the second voice H (recorded voice of a parent) of "look both ways next time" is played in step S210 after the action determination. In this case, the control unit 16 adds the second notification ID "2-4" of the second voice F to the action history data.

In this way, the control unit 16 determines whether the user has taken a safety action after the output (step S205) of the presentation instruction of the one first notification (step S207). Each time the determination is made, the control unit 16 adds the information indicating the one first notification, the information indicating the result of the determination, and the information indicating the second notification presented after the determination to the action history data of the user (step S211). These pieces of information can be used to calculate the second success rate in the next action determination, as described above.

Thus, according to the second embodiment, in addition to selecting one first notification from among a plurality of options, when selecting one second notification from among a plurality of second notifications, the one second notification with the highest probability of the user taking a safety action in the next action determination can be selected. In other words, it becomes easier to select a notification to which the user is more likely to pay attention. Therefore, the user's attention to the alert is maintained, and the probability that the user will stop taking an unsafety action and take a safety action is more likely to be increased.

As described above, the terminal device 10, which is the information processing device according to the above-described embodiment, stores a plurality of first notifications for prompting safety actions in association with the safety action that the user should take. When the terminal device 10 determines to prompt the user to take a safety action in accordance with the behavior of the user, the terminal device 10 selects one first notification from among the plurality of first notifications. The terminal device 10 outputs a presentation instruction for the selected one first notification.

According to the above configuration, a plurality of first notifications, that is, one set of first notifications is set for each safety action, and one first notification is selected from among the one set of first notifications in accordance with the behavior of the user. This makes it possible to reduce the possibility that the same notification is selected each time as the first notification presented to the user, unlike the prior art. Therefore, technology related to traffic safety education is improved in that it is easier to maintain the user's attention to the alert and to increase the probability of the user taking safety actions.

Although the present disclosure has been described above based on the drawings and the embodiments, it should be noted that those skilled in the art may make various modifications and alterations thereto based on the present disclosure. It should be noted, therefore, that these modifications and alterations are within the scope of the present disclosure. For example, the functions included in the configurations, steps, etc. can be rearranged so as not to be logically inconsistent, and a plurality of configurations, steps, etc. can be combined into one or divided.

Also, for example, in the embodiments described above, the first notification and the second notification are both presented in the form of a voice. However, at least one of these notifications may be presented in another form, for example, in the form of vibration. In this case, as the data of the notification, data indicating the vibration intensity or the vibration pattern output from the output unit 13 may be stored in the notification data of the notification database. The vibration intensity or the vibration pattern may be set to change according to the distance between any checkpoint and the user in the first example described above, and according to the duration of the unsafety action in the second example described above. For example, the vibration may be set to be stronger as the above distance is shorter or as the duration of the unsafety action is longer. Further, when both the first notification and the second notification are presented in the form of vibration, both notifications may be distinguished from each other by changing the vibration intensity or the vibration pattern output from the output unit 13 for each notification. The setting for changing the presentation mode of the notification in this way is not limited to the notification by vibration, and can be applied to other notification forms as appropriate. This makes it easier to ensure the safety of the user while allowing the user to experience a change in the risk and/or distinguish both notifications from each other.

Further, for example, the control unit 16 of the terminal device 10 may transmit the history data to the smartphone of the second user via a local network such as wireless LAN or via Bluetooth (registered trademark), infrared communication, or the like without the network 30 in response to a request from the smartphone of the user (that is, the second user) different from the user of the terminal device 10 (that is, the first user). In this case, the terminal device 10 of the first user and the smartphone of the second user directly transmit and receive data so that the second user can see the history of the movement route and the safety action of the first user.

Further, for example, in the embodiments described above, the configurations and the operations of the terminal device 10 may be distributed to a plurality of computers capable of communicating with each other.

Further, for example, an embodiment in which a part or all of the components of the terminal device 10 are provided in the arithmetic device 20 is also possible. For example, an embodiment in which a part or all of the operations executed by the terminal device 10 are executed by the arithmetic device 20 is also possible. In this case, the information processing device according to the present embodiment is the arithmetic device 20. For example, the arithmetic device 20 may further include a component corresponding to the acquisition unit 12 of the terminal device 10, and the control unit 23 of the arithmetic device 20 may execute a part or all of the operations of the control unit 16 of the terminal device 10. The control unit 23 of the arithmetic device 20 may execute an operation other than the operation of presenting the first notification or the second notification via the output unit 13 of the terminal device 10 (that is, step S105, S206, or S210). In this case, in step S104, S205, or S209, the control unit 23 of the arithmetic device 20 may transmit a presentation instruction for the one first notification or the one second notification to the communication unit 11 of the terminal device 10 via the network 30. The control unit 16 of the terminal device 10 may transmit the presentation instruction for the one first notification or the one second notification received via the communication unit 11 to the output unit 13.

Further, an embodiment is also possible in which, for example, a general-purpose computer functions as the terminal device 10 according to the above embodiments. Specifically, a program describing processing contents for realizing each function of the terminal device 10 according to the above embodiments is stored in the memory of the general-purpose computer, and the program is read and executed by the processor. Therefore, the present disclosure can also be realized as a program that can be executed by the processor or a non-transitory computer-readable medium (storage medium) that stores the program.

What is claimed is:

1. A wearable terminal device comprising:
a sensor module configured to acquire a behavior of a user holding the wearable terminal device;
an output device configured to play a voice massage;
one or more memories configured to store a notification database and an action history database of the user, the notification database including a plurality of first notifications for prompting a safety action to be taken by the user, the plurality of first notifications including four voice messages with four different voices and a same message, the four different voices being a male synthetic voice, a female synthetic voice, a character voice and a recorded voice; and
one or more processors, wherein the one or more processors are programmed to:
select one voice message from among the plurality of the first notifications to prompt the user to take the safety action in accordance with the behavior of the user acquired by the sensor module;
cause the output device to play the selected one voice message;
determine whether the user has taken the safety action after the output device playing the selected one voice message;
add information indicating the one voice message and information indicating a result of the determination to the action history database each time the determination is made; and
select the one voice massage based on the action history database, wherein the one or more processors are further programmed to;
calculate a probability that the user has taken the safety action after causing the output device to play each of the four voice messages, based on the action history database;
select one voice message with the highest probability of the user taking the safety action when selecting the one voice massage from among the plurality of the first notifications; and
cause the output device to play the selected one voice message with the highest probability of the user taking the safety action.

2. A wearable terminal device comprising:
a sensor module configured to acquire a behavior of a user holding the wearable terminal device;
an output device configured to play a voice massage;
one or more memories configured to store a notification database and an action history database of the user, the notification database including a plurality of first notifications for prompting a safety action to be taken by the user, the plurality of first notifications including four voice messages with four different voices and a same message, and the four different voices being a male synthetic voice, a female synthetic voice, a character voice and a recorded voice; and
one or more processors, wherein the one or more processors are programmed to:
select one voice message from among the plurality of the first notifications to prompt the user to take the safety action in accordance with the behavior of the user acquired by the sensor module;
cause the output device to play the selected one voice message:
determine whether the user has taken the safety action after the output device playing the selected one voice message;
add information indicating the one voice message and information indicating a result of the determination to the action history database each time the determination is made; and
select the one voice massage based on the action history database, wherein
calculate a probability that the user has taken the safety action after causing the output device to play each of the four voice messages, based on the action history database;
classify each of the four voice messages into one of a first group in which the probability is equal to or greater than a threshold value and a second group in which the probability is less than the threshold value; and
set a first selection rate that is a probability that the one voice message is selected from the first group to be higher than a second selection rate that is a probability that the one voice message is selected from the second group, when selecting the one voice message from among the plurality of the first notifications.

3. The wearable terminal device according to claim 1, wherein:
- the one or more memories are further configured to store a plurality of second notifications different from the plurality of the first notifications; and
- the one or more processors are further programmed to:
  - select one second notification from among the plurality of the second notifications after the determination; and
  - output a presentation instruction for the selected one second notification.

4. The wearable terminal device according to claim 3, wherein the one or more processors are further programmed to:
- add the information indicating the one voice message, the information indicating the result of the determination, and information indicating the second notification presented after the determination to the action history database each time the determination is made; and
- select the one second notification based on the action history database when selecting the one second notification from among the plurality of the second notifications.

\* \* \* \* \*